United States Patent [19]
Russo

[11] Patent Number: 5,347,168
[45] Date of Patent: Sep. 13, 1994

[54] CRYOGENIC ELECTRONICS POWER SUPPLY AND POWER SINK

[75] Inventor: Carl J. Russo, Loveland, Ohio

[73] Assignee: American Superconductor Corporation, Westboro, Mass.

[21] Appl. No.: 934,036

[22] Filed: Aug. 21, 1992

[51] Int. Cl.⁵ .............................................. H03K 3/38
[52] U.S. Cl. .................................... 307/245; 307/306
[58] Field of Search ...................... 307/245, 253, 306; 323/360, 907

[56] References Cited

U.S. PATENT DOCUMENTS

| | | | |
|---|---|---|---|
| 3,479,569 | 11/1969 | Prost et al. | 307/306 |
| 3,479,576 | 11/1969 | Satterthwaite et al. | 307/306 |
| 4,472,727 | 9/1984 | Tewksbury | 307/245 X |
| 5,010,255 | 4/1991 | Hilal et al. | 307/306 X |
| 5,087,610 | 2/1992 | Hed | 307/306 X |
| 5,099,152 | 3/1992 | Suzuki | 307/306 X |

*Primary Examiner*—Willis R. Wolfe
*Attorney, Agent, or Firm*—Fish & Richardson

[57] ABSTRACT

A cryogenically cooled circuit, operating at temperatures at which inductors windings of the circuit exhibit superconducting characteristics, provides unique advantages in high performance, preferably high power circuits. The entire circuit, as opposed to for example only the superconducting portions of the circuit, are refrigerated to cryogenic temperatures. Advantages in the characteristics of not only the superconducting based components but also the diodes, and gating elements such as MOSFET's, yield a uniquely advantageous circuit enabling the operation of, for example, a switching power supply at lower frequency using larger inductor values. The refrigeration penalty is overcome at power outputs on the order of 50 kilowatts while and equally important, size, component count, and stability benefits are attained by cryogenically cooling the entire circuit configuration.

6 Claims, 2 Drawing Sheets

CRYOGENIC ELECTRONICS POWER SUPPLY AND POWER SINK

The invention relates generally to large capacity power supply amplifier and motor controller methods and apparatus and in particular to large capacity, reduced size supply methods and apparatus employing cryogenic cooling.

BACKGROUND OF THE INVENTION

Both before and since the advent of high temperature superconductors, many investgators have analyzed and experimented to determine the operating characteristics of circuit components at low temperatures. In particular, the operation of MOSFET's, superconducting inductors, and cryocooled capacitors have been examined and thermal models have been developed for these components. For example, power MOSFET's have been operated at temperatures of 77K, and, significant advantages have been noted, such as a reduction of the on-resistance of the MOSFET's by as much as a factor of 30, at 77K. Nevertheless, researchers have not considered the advantages of cryogenically cooled components operating together in a circuit configuration, for example, because of the refrigeration cost associated with cryogenically cooled electronics. Cryocooled electronics have been considered for enhanced noise performance of amplifiers, and to speed up computer circuitry.

As will be described in more detail below, one particularly advantageous use of cryogenically cooled electronics is in high power switching power supplies. To understand those advantages more detail, however, a brief discussion of the limitations of such power supplies operating at room temperature needs to be considered. Switch mode amplifiers, often called class D amplifiers, regulated power supplies, and frequency converters became a reality with the introduction of high speed power silicon devices. The main advantages of these switch mode applications is that, at least for ideal devices, the only losses involved are the saturation losses of the power devices in the forward direction. These losses are very low compared to the losses sustained in linear regulation or amplification devices; and these low losses have allowed the physical size of regulated power supplies to be reduced considerably.

For example, a linearly-regulated, three voltage, 20° watt power supply was typically over a cubic foot in volume, contained a heavy and expensive power transformer with its associated filtering components, and required approximately 200 watts of dissipation capacity in the active devices. In the newer switch mode versions of these 200 watt power supplies, which appear in nearly every personal computer, the volume of the supply has been reduced between four and six times, with comparable reductions in weight, power requirements, and cost.

In accordance with the prior art, the typical method used to obtain these size reductions has been to replace conventional power frequency components with significantly smaller filter and active components which operate at 300 to 30,000 times the frequency of the older power supplies. The power-speed product of the active devices, and the thermal limitations of the filter components, has slowed progress in the design of these switching mode devices. The most common power supply sizes range from a few watts (20–800 kHz) through a few kilowatts (18–35 kHz). While larger amplifiers and supplies have been built (5–50 KW (5–20 kHz)), they are rare.

There are very few switching mode power supply designs which operate above these speed-power levels, unless the design is based on integrating multiple small modules, or using multiple active devices at lower frequencies with multiple passive components of smaller rating to limit the thermal problems. In general, the losses scale at least linearly with the frequency of operation. Therefore, very high power density designs, operating at high frequency, are limited to a low power output. These losses are often dominated by the switching losses in the power devices.

Referring to FIGS. 1 and 2, in a typical prior art switch mode power supply design, (and a simplest design), a so-called non-isolated Buck converter has a DC input voltage V+, a DC output voltage $V_{out}$, an active switching device illustrated as an NPN transistor, $Q_1$, a rectifying diode $D_1$, a series inductor $L_1$, a capacitor $C_1$, and a resistive load R. The output of this switching power supply is described by the equation:

$$V_{out}=(t/T)V_+ =kV_+ \qquad \text{(Equation 1)}$$

where "k" is the duty cycle. The voltage and current across the inductor $L_1$ is illustrated in FIG. 2.

Referring to FIG. 3, in other architectures for amplifiers, power supplies and frequency convertors, the next level of complexity comes by adding a second inductor $L_2$, and isolating the input from the output using a capacitor. This is often done when an output voltage polarity different from an input voltage polarity is required. Referring to FIG. 3, the addition of the second reactive element $L_2$ makes it possible, by isolating the input and output, to provide an output voltage having a different polarity than the input. Here, the active device is $Q_1$ is operated in a shunt mode. The operation of the power supply of FIG. 3 is more complex than the power supply of FIG. 1, and is detailed in Hnatnek, "Design of Solid State Power Supplies", Third Edition, 1989, Van Nostrand Rheinhold, at pages 160 and following. The DC isolation is provided by capacitor $C_1$ and the drive to the base of the active device $Q_1$ turns the transistor hard on for a time t with a period T. When $Q_1$ turns on, a voltage $V_+$ is developed across $L_2$ and the current in $L_2$ begins to rise at a rate of $V_+/L_2$. When $Q_1$ turns off, the current $L_2$ continues to flow into $C_1$ through the rectifier $D_1$. Eventually capacitor $C_1$ charges to a constant voltage $V_c$. The equations which describe the on and off operation of the circuit are given in two pairs below. Equations 2 and 3 describe the operation when $Q_1$ is on and the equations 4 and 5 describe the operation when $Q_1$ is off.

$$V_+ = L_2\, dI_1/dt \qquad \text{(Equation 2)}$$

$$V_c = L_1\, dI_2/dt + I_2 R_L \qquad \text{(Equation 3)}$$

$$V_+ - V_c = L_2\, dI_1/dt \qquad \text{(Equation 4)}$$

$$0 = L_1\, dI_2/dt + I_2 R_L \qquad \text{(Equation 5)}$$

In order to obtain reasonably ripple free output from the circuit of FIG. 3, and the potential for negative output voltage, the values of the inductors $L_1$ and $L_2$ must be large. Thus, the circuit of FIG. 3 requires large inductors and capacitors for proper operation of the circuit where high power is to be provided. When the power supplies of FIGS. 1 and 3 are operated in a low power environment, the component values are typically kept small, the loss is tolerated, and the frequency of operation (1/T) is raised to as high a value as possible. In high power circuits, this is not usually an option without substantially increasing the component count and developing strategies for removing the heat from both the capacitors and the inductors.

Thus, as the power output of the switch mode power supply increases, one runs into severe "component constraints" as are detailed in Hnatnek, referred to above. The components of a power supply such as those described in FIGS. 1 and 3, are subject to very high electrical stress; and in particular, the components subject to the most stress are the switching transistor, the diode, and the coupling or filter capacitors.

It is therefore an object of the invention to provide a power supply circuit which can produce substantial power, on the order of greater than 100 watts and as much as, for example, 50 kilowatts or more, which is reliable, which has a substantially reduced size, which reduces stress on the components being employed, and which delivers substantially improved performance using high temperature superconductor inductors. A further object of the invention is a power supply, especially in larger sizes, which is considerably less expensive than a supply based on conventional technology.

SUMMARY OF THE INVENTION

The invention features to a high performance circuitry which delivers power or sinks power of typically more than 100 watts, by embedding a superconductor inductor containing electrical circuit in a cryogenically cooled environment. The circuit includes both an inductor or transformer winding having a superconducting material and other circuit components, all connected in a selected circuit configuration. The circuit is cryogenically cooled to a temperature at which the winding(s) exhibits superconductivity. Power is provided to the circuit configuration which then operates to generate (or sink) output power. Preferably, the method further includes the step of chopping or gating the input power at a frequency in excess of 500 Hertz and of providing an output power level of greater than 50 kilowatts.

In a specific aspect of the invention, a switching power supply features a switching power supply circuit having at least one inductor winding composed of a high temperature superconducting material, a refrigeration apparatus for cryogenically cooling the supply circuit to a temperature wherein the inductor winding exhibits superconducting characteristics, and input/output connections for applying power to and taking power from the supply circuit. In particular embodiments, the supply circuit can provide at least 100 watts of power, and preferably in excess of 50 thousand watts of DC power. In another aspect, the circuit features a MOSFET device in circuit configuration with the inductor winding, and in another aspect, the circuit can include a superconducting capacitor for improved efficiency. (Other power devices, such as bipolar IGFET's and GTO's can be used.) In Another embodiment, similar circuitry with a different drive and filter configuration can be used to build switch mode amplifiers, frequency changes, or motor starters controllers. Depending on the constraints of the design, one, many, or all of the components can be operated at reduced temperatures.

BRIEF DESCRIPTION OF THE DRAWINGS

Other objects, features, and advantages of the invention will be apparent from the following description taken together with the drawings in which.

DESCRIPTION OF PARTICULAR PREFERRED EMBODIMENTS

Figure 4:
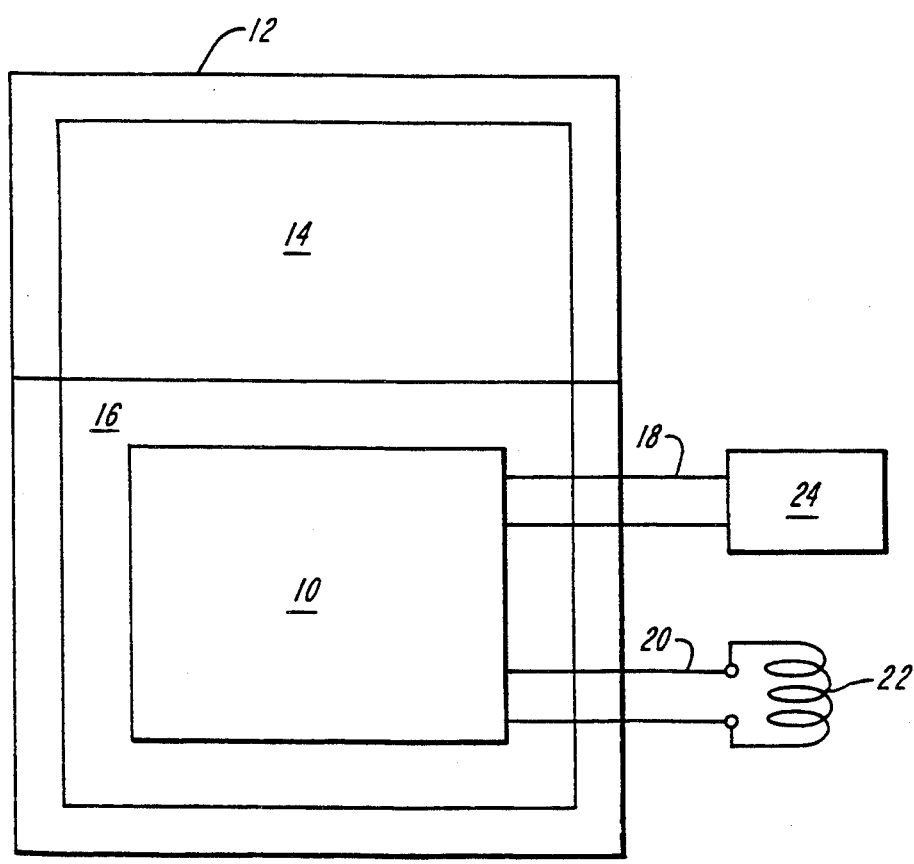
FIG. 4 is a schematic representation of a circuit configuration in accordance with a preferred embodiment of the invention.

In accordance with the invention, referring to FIG. 4, an high performance electronic circuitry 10 is cryogenically cooled in a refrigeration device 12. The refrigeration equipment is provided in section 14 of the refrigeration device and the circuitry 10 is contained in a refrigeration compartment 16. Connections for interfacing power to circuitry to the circuitry 10 are provided over lines 18 and connections for receiving or sinking power from or to the circuitry are provided over lines 20 which are connected a load 22. A power source 24, connected to lines 18, can be, for example, a DC or AC power source depending upon the circuit configuration and function of circuitry 10.

The advantages of cryogenically cooling an entire circuitry 10 are not obvious to one practiced in the art. In particular, to cryogenically cool an entire circuit requires substantial refrigeration capacity and the cost of that refrigeration capacity, the refrigeration penalty, must be overcome. Thus, from an efficiency point of view, there must be a good reason to pay the refrigeration penalty in the design of such a power generating system. However, "reason" for justifying the expense for amplifiers, motor controllers, and power supplies whose output power exceeds 50 kilowatts is clear, if it is assumed that the refrigerator is operating at 77K and has an overall thermal efficiency greater than or about 6%. (For a commercially available Carrier cryocooler, a 5 kilowatt input power produces 300 watts of cooling at 77K, at 6% overall efficiency.)

For a typical 50 kilowatt switching power supply, operating at 85% overall efficiency at room temperature, the power dissipation may be 8.8 kilowatts. If one were able to improve the efficiency to 99%, due to cryogenical cooling of all of the components of the power supply and the provision of high temperature superconducting inductors, then only 505 watts of heat would need to be removed through the refrigeration system. Assuming a 6% efficient refrigeration system, this would require an input refrigeration power of 8.4 killowatts which represents a break-even point in sizing of the power supplies from solely an energy viewpoint.

Instead of cooling all of the circuitry one may decide to cool only some of the components such as the superconducting inductors and filter capacitors. An example of this would be a 600 Volt, 15A 9 KW power supply operating at 13 kHz with 350 watts of loss, most of it in the switching losses of the devices. Hnatnek teaches that the switching losses in the active devices dominate the design; and these losses increase linearly with frequency. If the designer wished to minimize cost in a ten times scale up in output power, at the same voltage, of the design, one might consider reducing the frequency of operation by a factor of ten, keeping the power dissipation rating of the devices approximately the same and scaling up the size of the filter components so that $L_{new} C_{NEW}$ equals approximately 100 $L_{OLD} C_{OLD}$.

If conventional technology was used, this would not be an appropriate approach. Consider the following two extremes. The original design used $L_{old}$ equal to approximately 10 mHs and $C_{OLD}$ equal to approximately 2000 microfarads. Both the inductor and filter capacitor must have low losses when subject to high AC currents at the operating frequency, and harmonics thereof. Therefor, high cost oil or filter capacitors may be needed. For example, if oil filled 50 microfarad, 1 KV capacitors are used, 40 would be required in the original design. If the inductor is kept the same, then 100 times as many capacitors are required. This is an impractical number. Conversely, if the capacitor value is kept the same, then the inductor must scale to one hundred times its original value. A 1H copper and ferrite or air core choke operating with 150 Amps of current flow, weighs several tons. However, the high temperature superconductor equivalent inductor weighs approximately 30 kg. If a 100 kg, 2 kw input power refrigerator is added the weight, and cost savings and energy savings are substantial.

Just as important, however, as the energy balance and related cost consideration, is the ability to control size (volume) in power supplies such as those having an output power greater than 50 kilowatts. In practice, this has very difficult to accomplish since the size of the components, in particular the inductive components, tends to grow in volume at least linearly proportion to the output power. As a result, the ability to substitute an inductive coil having superconducting characteristics for the typical copper based coil provides significant advantages. Further, as is well described in the literature with regard to individual electronic components, other significant advantages have been noted in other circuit components by operating them in a cryogenic environment.

Considering, in particular, the inductors used in a switching power supply, is known that to ensure continuous operation of inductor $L_2$ (in FIG. 3) there must be a certain minimum size to ensure stable operation with good regulation. The output current $I_2$. In particular, must be larger than half of the AC current flowing in inductor $L_2$ and this can be accomplished by making the value of $L_2$ satisfy the equation:

$$L_2 > (\tfrac{1}{2} f_{min}) (V_{out}/I_{2min})$$
$$(1 - K_{max}(V_{+min}/V_{+max})) \quad \text{(Equation 6)}$$

In this equation $f_{min}$ is the minimum operating frequency for the converter. Thus, high voltage, low frequency power supplies require the largest inductors to operate correctly, and since $L_2$ has a DC current in, for example, the application of FIG. 3, an air gap is required in a copper based design having a magnetic core.

Further, a major constraint on the core is to limit the temperature rise in it because of the relatively low Curie temperature, about 200° C., which limits the maximum operating temperature of the core to about 100° C. While modern insulation technology allows the transformer or inductor winding to operate at higher temperatures, the ferrite cores, or their lower loss equivalents, cannot take the heat which is generated by such operation. Thus, the larger the inductor, the larger the problem since the volumetric heat generation is a constant while the surface area of the inductor, from which the heat is rejected, does not scale linearly with the volume. Thus core losses generally limit current densities in the winding to less than the 200 amperes per square centimeter, and may force air core designs in larger systems.

Figure 1:
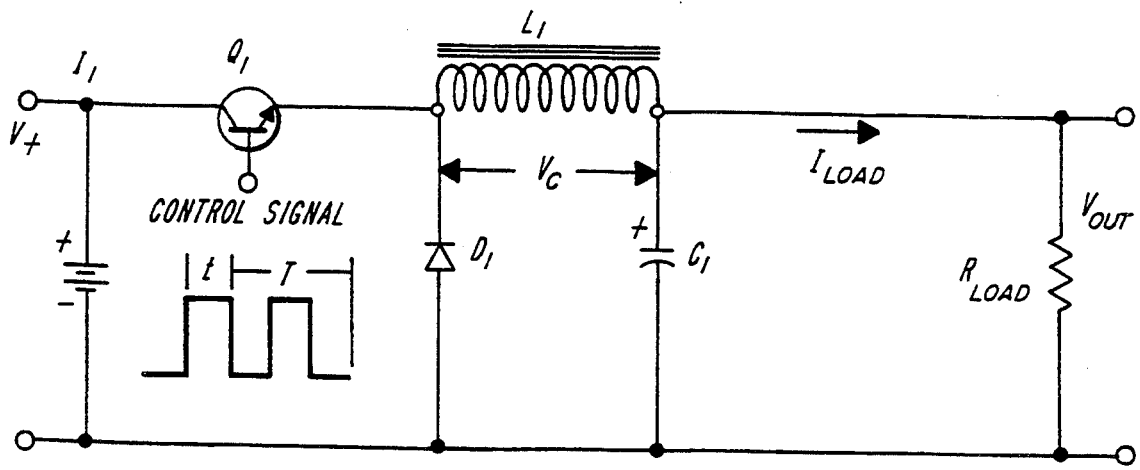
FIG. 1 is a circuit diagram of a simple switching mode power supply circuit.
Figure 2A:
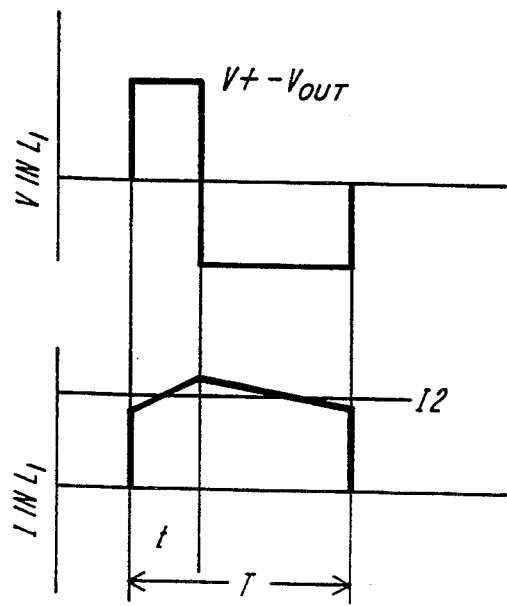
FIGS. 2A and 2B are representation of voltages and currents in the circuit of FIG. 1 during normal operations.
Figure 2B:
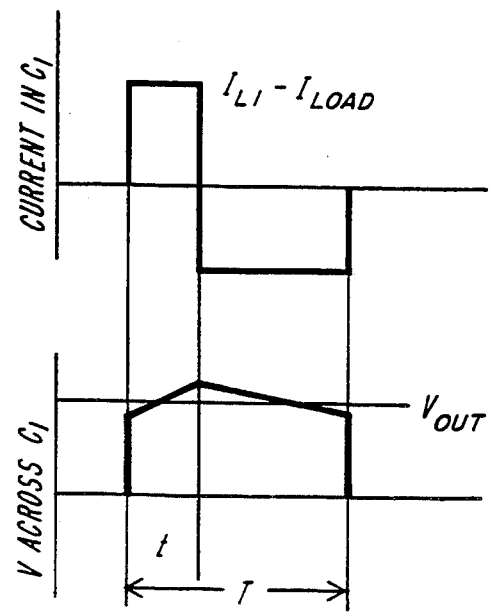
Figure 3:
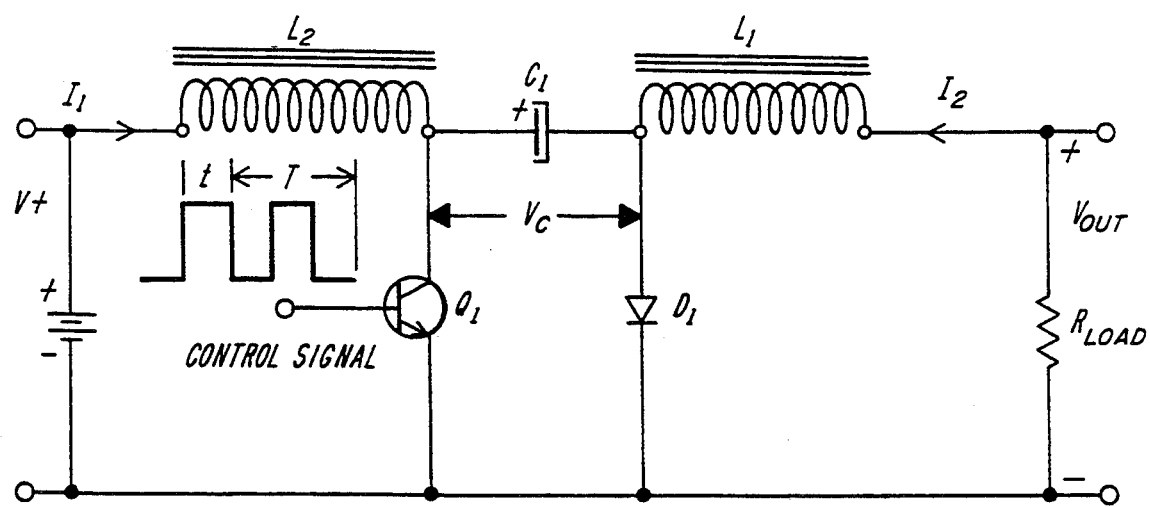
FIG. 3 is a circuit diagram of more complex Cuk converter.

Further, with regard to the use of capacitors in the circuitry 10, the AC component of the output must flow through the capacitor in, for example, the circuit of FIG. 3. This current increases with frequency since for a capacitor:

$$i = C \, dv/dt \quad \text{(Equation 7)}$$

Capacitors thus suffer from high power dissipation in many capacitor designs, and due to the poor power factor. This is in addition to the leakage losses. There is also a peak current limitation for capacitors and the advantages of using cryocooled capacitors, is substantial.

Accordingly, therefore, referring to the Cuk converter of FIG. 3 as a typical example, substantial advantages can be obtained by cryogenically cooling the entire power supply circuit. By making the inductor windings of materials which exhibit superconducting characteristics at 77K, by making the capacitor of a specially formulated cryogenic, loss loss, dielectric material, and by obtaining the advantages of cryogenically cooled MOSFET's and diodes, there can result the following substantial advantages. First, cooling the MOSFET provides for a faster operating device (because of the higher mobility within the semiconductor, and possibly the ability to operate at higher voltages (because of the control of parasitic voltages and freezeout of the breakdown mechanism), the ability to operate at higher current densities in part because the mobility is higher and current flow is more uniform, and because a lower voltage can be placed across the MOSFET junction.

Similarly advantages result when a cryogenic capacitor is used. In particular, a cryogenically cooled capacitor provides for greater voltage breakdown ratings, smaller AC loss, and greater energy density.

The inductor containing devices, which can also be transformers, need not operate at as high a frequency when superconducting materials are used. Typically, in a high output power supply, in which a DC voltage input is converted to a DC output (as in the circuit configuration of FIG. 3), a relatively small storage inductor and a very high speed, pulse width modulated switch is used to produce a pulsed DC. A high frequency filter then provides a variable amplitude DC, the amplitude depending upon the switching pattern. While the high frequencies reduce the energy stored in and the size of the coil, there is difficulty in providing high frequency, high power switching devices. Further, the heat dissipation due to the high frequency dielectric losses and required high currents is substantial. Using an coil containing device where the winding is a superconducting material thus has the advantage of allowing a lower modulation frequency to be used while keeping the coil sufficiently small since it does not have the concomitant difficulties of a copper based inductor. In particular, for example, a copper based coil has a skin effect so that the penetration depth is inversely proportional to the square root of frequency. Thus a wire cannot be made small enough, when operating in the 600 kHz range, to fully utilize the entire volume of the wire. The superconducting inductor can thus be used to allow the power transformer to operate at a lower frequency while providing a higher energy. The substantially sole issue is how to get the thermal dissipated power out of the power supply and, as noted above, this can be achieved, economically, for power supplies above about 50 kilowatts by using the already available cooling or refrigeration system. For lower output power supplies, the economics based from a solely energy point-of-view are not strong, and the lower size which can be obtained is significant.

Accordingly, there is described a method and apparatus for providing high performance circuitry by cryogenically cooling the entire circuit configuration. The refrigeration penalty which must be paid is balanced in high power devices by the reduction in power dissipated by the same circuitry at room temperature, and in the case of smaller output supplies, is balanced by the ability to provide smaller size components. The invention enables the generation of higher power in such applications as battery chargers, welding power supplies, electrochemical processing power supplies, switching and other types of power supplies, power amplifiers, frequency converters, and motor starters and controllers. In particular, note that the power amplifier can be used as frequencies up to and including one megahertz which was previously unavailable for the reasons noted previously.

In a typical inductor coil, one can use BSCCO as the superconducting material as has been well described and documented in the art. A typical paper describing the superconducting characteristics of BSCCO at 77K is: Malezemoff - Kiev conference, Applied Superconductivity Conference. Similarly, perovskites of structure A $BO_7$ can be used as the superconducting material for a capacitor device.

Additions, subtractions, deletions and other modifications of the described embodiment will be apparent to those practiced in the field, and are within the scope of the following claims.

What is claimed is:

1. A switching power supply comprising:
   a switching power supply circuit comprising at least one inductor winding composed of a high temperature superconducting material and at least one of a MOSFET, bipolar IGFET, GTO or other power device in circuit configuration with said inductor winding,
   refrigeration means for cryogenically cooling at least said inductor winding of said circuit to a temperature wherein said inductor winding exhibits superconducting characteristics, and
   input/output means for supplying power to said circuit and receiving power from said circuit,
   said circuit providing at least one hundred watts of power.

2. A switching power supply comprising:
   a switching power supply circuit comprising at least one inductor winding composed of a high temperature superconducting material and a capacitor constructed at least in part of materials exhibiting low dielectric losses and high power densities at cryogenic temperatures,
   refrigeration means for cryogenically cooling at least said inductor winding of said circuit to a temperature wherein said inductor winding exhibits superconducting characteristics, and
   input/output means for supplying power to said circuit and receiving power from said circuit,
   said circuit providing at least one hundred watts of power.

3. A high performance circuit comprising:
   a plurality of circuit elements in a circuit configuration, said circuit elements including at least one inductor winding composed of a high temperature superconducting material and at least one of a MOSFET, bipolar IGFET, GTO, or other power device in circuit configuration with said inductor winding,
   means for cryogenically cooling all of said circuit elements to a temperature wherein said inductor winding exhibits superconducting properties, and
   input/output means for supplying power to said circuit and receiving power from said circuit,
   said circuit providing at least one hundred watts of power.

4. A high performance circuit comprising:
   a plurality of circuit elements in a circuit configuration, said circuit elements including at least one inductor winding composed of a high temperature superconducting material and a capacitor constructed at least in part of materials exhibiting low dielectric losses and high power densities at said cooling temperatures,
   means for cryogenically cooling all of said circuit elements to a temperature wherein said inductor winding exhibits superconducting properties, and
   input/output means for supplying power to said circuit and receiving power from said circuit,
   said circuit providing at least one hundred watts of power.

5. A high performance circuit comprising:
   a plurality of circuit elements in a circuit configuration, said circuit elements including at least one inductor winding composed of a high temperature superconducting material,
   switching means for operating at a frequency greater than 500,000 Hertz,
   means for cryogenically cooling all of said circuit elements to a temperature wherein said inductor winding exhibits superconducting properties, and
   input/output means for supplying power to said circuit and receiving power from said circuit.

6. A method for delivering greater than 100 watts of output power comprising the steps of:
   connecting an inductor winding composed of a superconducting material in a circuit configuration with other circuit components,
   cryogenically cooling portions of said circuit configuration to a temperature at which said inductor winding exhibits superconductivity,
   supplying an input power to said circuit configuration for generating said output power,
   chopping said input power at a frequency in excess of 500,000 Hertz, and
   driving an output load of greater than 5,000 watts.

* * * * *